United States Patent [19]

Tempel et al.

[11] Patent Number: 5,066,309
[45] Date of Patent: Nov. 19, 1991

[54] LIQUID METAL COMPLEX DYE PREPARATIONS, PROCESS FOR THEIR PREPARATION AND THEIR USE

[75] Inventors: Ernst Tempel, Riehen; Pia Grimbühler-Can, Basel, both of Switzerland

[73] Assignee: Ciba-Geigy Corporation, Ardsley, N.Y.

[21] Appl. No.: 550,430

[22] Filed: Jul. 10, 1990

[30] Foreign Application Priority Data

Jul. 14, 1989 [CH] Switzerland ............... 2645/89

[51] Int. Cl.$^5$ .................. C09B 67/00; C09B 45/00
[52] U.S. Cl. ............................ 8/527; 8/589; 8/611; 8/685; 8/924
[58] Field of Search .............. 8/527, 611, 685, 589

[56] References Cited

U.S. PATENT DOCUMENTS

| | | | |
|---|---|---|---|
| 3,989,452 | 11/1976 | Hugelshofer | 8/527 |
| 4,322,415 | 3/1982 | Abel et al. | 8/582 |
| 4,328,220 | 5/1982 | Abel et al. | 8/582 |
| 4,405,329 | 9/1983 | Abel et al. | 8/527 |
| 4,500,321 | 2/1985 | Hugelshofer et al. | 8/527 |

FOREIGN PATENT DOCUMENTS

| | | |
|---|---|---|
| 1165311 | 9/1969 | United Kingdom . |
| 1355437 | 6/1974 | United Kingdom . |

*Primary Examiner*—A. Lionel Clingman
*Attorney, Agent, or Firm*—George R. Dohmann; Edward McC. Roberts

[57] ABSTRACT

Concentrated, aqueous preparations of 1:2 metal complex dyes which contain 10 to 30% by weight of a 1:2 metal complex dye, 3 to 25% by weight of an anionic dispersant, 1 to 15% by weight of a polyhydroxy compound and 0 to 25% by weight of a customary formulation assistant, in each case based on the total preparation, and water in an amount such that the sum of all the components is 100%, have an excellent stability, are readily pourable and can be diluted with water as desired, and are therefore particularly suitable for the preparation of dyebaths or printing pastes which are employed, in particular, for continuous dyeing or printing of textile fibrous materials of synthetic polyamide.

12 Claims, No Drawings

LIQUID METAL COMPLEX DYE PREPARATIONS, PROCESS FOR THEIR PREPARATION AND THEIR USE

The present invention relates to stable, concentrated, aqueous preparations of 1:2 metal complex dyes, a process for their preparation and their use for dyeing and printing, in particular, nitrogen-containing textile fibrous materials.

It is already known that organic solvents can be used for the preparation of concentrated 1:2 metal complex dye preparations. U.S. Pat. No. 3,989,452 thus describes concentrated organic solutions of metal complex azo dyes containing sulfo groups, which as a rule can be diluted with water as desired and can then be used, for example, as dyebaths or printing pastes, with or without the addition of customary dyeing assistants.

The presence of relatively large amounts of organic solvents in the dyebaths or printing pastes referred to can nevertheless result in certain disadvantages, for example non-levelness and inadequate fastness properties in the dyed/printed fibrous materials, caused by a loss in the stability of the dyebaths or by blockage of fine grid openings in the printing templates of carpet printing due to inadequately dissolved dye, and furthermore also odour nuisances and effluent pollution.

The object of the present invention is thus to provide stable concentrated preparations of 1:2 metal complex dyes without these disadvantages.

It has now been found that the object described can be achieved according to the invention with aqueous concentrated dye preparations which are practically solvent-free. The organic compounds used in these preparations, for example polyhydroxy compounds, are not capable of acting as the actual solvent merely because of the small amounts of these used. The preparations according to the invention are thus, for example, aqueous dispersions and not organic solutions of the dyes.

The present invention thus relates to stable concentrated aqueous preparations of 1:2 metal complex dyes, which contain (1) 10 to 30% by weight of a 1:2 metal complex dye, (2) 3 to 30% by weight of an anionic dispersant, (3) 1 to 15% by weight of a polyhydroxy compound and (4) 0 to 25% by weight of a customary formulation assistant, in each case based on the total preparation, and water in an amount such that the sum of all the components is 100%.

The present invention furthermore relates to a process for the preparation of the dye preparations according to the invention and their use for the preparation of padding liquors, dyebaths or printing pastes for dyeing or printing textile nitrogen-containing fibrous materials.

The 1:2 metal complex dyes [component (1)] used in the preparations according to the invention are, in particular, 1:2 metal complexes of azo or azomethine dyes or mixtures of these dyes, and preferably 1:2 cobalt or chromium complexes of azo or azomethine dyes which contain a complexing group, in particular an amino, carboxyl or hydroxyl group, in the o-position relative to the azo/azomethine bridge.

The complex dyes are thus, for example, 1:2 cobalt or 1:2 chromium complexes of, in particular, o—carboxy—o'—hydroxy—, o—hydroxy—o'—amino— or o,o'—dihydroxyazo dyes containing benzene-azo-benzene, naphthalene-azo-naphthalene, benzene-azo-naphthalene, benzene-azo-pyrazolone, benzene-azo-pyridone or benzene-azo-acetoacetamide structure, it being possible for these structures to be unsubstituted or substituted. Suitable substituents are, for example, carboxyl, sulfo ($-SO_3H$), substituted or unsubstituted sulfonamide, halogen, acetamido or nitro.

The dyes can be mono-, dis- or polyazo dyes, it also being possible for these to be in the form of alkali metal (sodium or potassium) or amine salts (low molecular weight alkyl- or alkanolamines).

The two complexing dyes from which the 1:2 metal complex is built up can be identical or different. Mixtures of 1:2 metal complex dyes such as are formed in the mixed metallization of two or more dyes capable of complexing are also suitable.

The 1:2 metal complex dyes used in the preparations according to the invention can be water-soluble but also only moderately to sparingly soluble in water. They are described in many instances in the patent literature.

Suitable anionic dispersants of component (2) are, for example, condensation products of aromatic sulfonic acids and formaldehyde and lignin- or oxyligninsulfonic acids, it also being possible for mixtures of these products, which can also be in salt form if appropriate, to be employed.

Condensation products are in particular those of substituted or unsubstituted naphthalenesulfonic acids and formaldehyde, condensation products of naphthalenesulfonic acids, formaldehyde and benzenesulfonic acids, condensation products of substituted or unsubstituted phenol-or cresolsulfonic acids and formaldehyde, alkali metal salts of condensation products of substituted or unsubstituted phenolsulfonic acids, formaldehyde and urea, condensation products of ditolyl ether, formaldehyde and sulfuric acid and alkali metal salts or ammonium salts of ligninsulfonic acid or oxyligninsulfonic acid. The alkali metal salts mentioned can be lithium salts or potassium salts, and in particular sodium salts.

The polyhydroxy compounds of component (3) in the dye preparations according to the invention are, for example, di- or polyalcohols, in particular 2- to 6-valent alcohols having 2 to 6 carbon atoms, such as ethylene glycol, diethylene glycol, triethylene glycol, 1,2-propylene glycol, dipropylene glycol, glycerol, trimethylolethane, trimethylolpropane, pentaerythritol or sorbitol. Mixtures of these compounds can also be employed. Sorbitol and mixtures of sorbitol and glycerol are particularly preferred.

The polyhydroxy compounds of component (3) essentially serve as humectants in the dye preparations according to the invention; they can furthermore desolubilize the dyes and in this way cause a low viscosity in the dye preparations (viscosity regulation agents). They are present in the dye preparations according to the invention in the stated amounts, preferably in an amount of 1 to 14% by weight and in particular of 2 to 12% by weight. However, the polyhydroxy compounds do not interfere with subsequent preparation of the dye liquors or printing pastes.

The formulation assistants which optionally can be present as component (4) in the dye preparations according to the invention include, inter alia:

anionic surfactants, for example fatty alcohol-, alkylphenol- or fatty amine-ethylene oxide adducts esterified with sulfuric acid, and alkali metal, amine or ammonium salts, thereof, and in particular 2-alkylbenzimidazoledisulfonates in which alkyl contains 10 to 25 carbon atoms (for example sulfonated reaction products of o-phenylenediamine, stearic acid and benzyl chloride). They can be present in amounts of about 0 to 5% by weight, in particular 1 to 3% by weight, based on the weight of the preparation;

zwitterion compounds having an additional wetting and also dispersing action, for example, trimethylglycocoll (betaine), which can be present in amounts of about 0 to 3% by weight, in particular 2 to 4% by weight, based on the weight of the preparation;

compounds having a solubilizing action and for prevention of undesirable crystallization, for example urea or in particular caprolactam, which can be present in amounts of about 0 to 20% by weight, in particular 5 to 10% by weight, based on the weight of the preparation;

customary deaerating and foam prevention agents, for example long-chain alcohols or diols, for example the compound of the formula

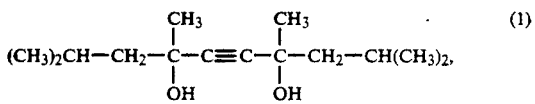

(1)

which can be employed in amounts of about 0 to 3% by weight, in particular 1 to 2% by weight, based on the weight of the preparation;

pH-regulating compounds, such as inorganic or organic acids or bases, for example mineral acids (hydrochloric acid, sulfuric acid or phosphoric acid) or low molecular weight carboxylic acids (formic acid, acetic acid or tartaric acid), or alkali metal hydroxides (lithium hydroxide or sodium hydroxide) or customary amines or ammonium compounds. These compounds can be employed, for example, in amounts of 0 to 3% by weight, in particular 0 to 1% by weight, based on the weight of the preparation.

The dye preparations according to the invention preferably have the following composition: (1) 10 to 20% by weight, of an 1:2 metal complex dye, (2) 5 to 25% by weight, and in particular 5 to 20% by weight, of an anionic dispersant, (3) 2 to 12% by weight of a polyhydroxy compound and (4) 0 to 25% by weight of a customary formulation assistant, in each case based on the total preparation, and water in an amount such that the sum of all the components is 100%.

The stable, concentrated, aqueous 1:2 metal complex dye preparations according to the invention can be prepared by customary methods, for example by converting the dyestuff into a free-flowing mixture with water and the components (2), (3) and optionally (4), subsequently subjecting this to mechanical comminution and then adjusting the preparation to the desired concentration with water and optionally other formulation assistants.

The 1:2 metal complex dye or mixtures of such dyes are thus suspended in water, for example, in the form of the crude dye (press-cake), and optionally also in the aleady worked-up (desalinated) form (for example prepared by a membrane treatment), together with suitable anionic dispersants, the polyhydroxy compounds and if appropriate the customary formulation assistants, and the suspension is subjected to mechanical comminution, in particular in the form of wet grinding in bead or sand mills suitable for this purpose.

The polyhydroxy compounds are employed as such or as aqueous solutions, the amount of water being kept low and being not more than 10 to 20% by weight, based on the aqueous solution of the polyhydroxy compounds.

If appropriate, the crude dye (press-cake) which has been synthesized and precipitated can be continuously further processed directly to give the dye preparations according to the invention.

An adequate state of fine division of the dye preparation can be achieved if the dye particle size is less than 5 μm and is preferably in the range from about 1 to 5 μm. This can usually be checked by a filter test, under the microscope or by sedimentation analysis.

The dye preparations according to the invention thus obtained contain the dye or dyes in a stable finely divided form. They can be in the form of colloidal aqueous solutions or aqueous dispersions, are readily pourable and are stable over a wide temperature range (for example −10° to +40° C., in particular also in the range of about 0° C.), and also towards mechanical influences. They are miscible or dilutable with water in all proportions, without the dyes precipitating or phases starting to form.

They are suitable for the preparation of padding liquors, dyebaths or printing pastes (dilution factors in the range from 1:1 to 1:15) for dyeing and printing, in particular, textile, nitrogen-containing fibrous materials, textile polyamide fibrous materials, in particular those of synthetic polyamides, for example polyamide-6 or polyamide-6,6, which can be in widely varying states of processing, and optionally also as mixtures with other fibrous materials, being preferred.

A preferred field of use here is the dyeing of such textile materials by the polyamide continuous process in the automobile (automotive) and carpet sector (pad-batch or pad-steam process).

The subject matter of the invention is illustrated in more detail in the following examples, without being limited to these. Parts and percentage data relate to the weight, unless stated otherwise. Parts by weight bear the same relation to parts by volume as the kilogram to the liter. The temperature is stated in degrees Celsius.

EXAMPLE 1:

91 parts of water and 50 parts of aqueous sorbitol solution (containing a small amount of glycerol and up to about 20% of water, based on the total solution) are initially introduced into a grinding vessel. 200 parts of ε-caprolactam, 50 parts of naphthalenesulfonic acid-formaldehyde condensation product (powder) and 30 parts of sulfite waste liquor (powder) are added, while stirring. 429 parts of a press-cake of the dye C.I. Acid Blue 171 (dry content: 37%) are then introduced in portions into the clear solution and are subsequently dispersed with a toothed disc dissolver for 2 hours. After addition of 50 parts of water, the dye preparation is subjected to wet grinding (430 revolutions per minute) in the presence of glass beads (diameter 1 mm) for 1 hour. During this procedure, the grinding vessel is cooled with water. The end of the grinding is reached when a residue is no longer detectable on filter paper (filter test).

The filter test is performed by taking up 1 g of dye (100%) in 100 ml of water, stirring the mixture for 2 minutes, filtering it through a filter paper (Schleicher und Schüll, No. 597) and rinsing the filter with 50 ml of water.

The glass beads are sieved off and cleaned with 100 parts of water; this wash water is combined with the dye preparation.

The finely divided dye dispersion thus obtained has a dye content of 15.9% by weight and a total dry content of 43.9% by weight.

It is stable in temperature ranges from −10° to +40° C. for several months. It is pourable and meterable and is particularly suitable for the preparation of dye liquors or printing pastes.

Finely divided dye dispersions having the following compositions are obtained analogously:

(a) 13.0% by weight of C.I. Acid Yellow 116,

| | |
|---|---|
| 10.0% by weight of | aqueous sorbitol solution (containing a small amount of glycerol and about 10 to 20% by weight of water), |
| 14.0% by weight of | naphthalenesulfonic acid-formaldehyde condensation product, |
| 1.0% by weight of | the compound of the formula |

$$\left[ (CH_3)_2CH-CH_2-\underset{\underset{OH}{|}}{\overset{\overset{CH_3}{|}}{C}}-C\equiv \right]_2 \quad (1)$$

(50% solution in ethylene glycol)

| | |
|---|---|
| 1.0% by weight of | sodium 1-benzyl-2-heptadecylbenzimidazole-disulfonate and |
| 61.0% by weight of | water. |

C.I. Acid Yellow 59 can also be employed instead of C.I. Acid Yellow 116.

(b) 16.7% by weight of C.I. Acid Orange 162,

| | |
|---|---|
| 8.0% by weight of | aqueous sorbitol solution (containing a small amount of glycerol and water as stated under (a)), |
| 12.0% by weight of | sulfite waste liquor (powder), |
| 6.0% by weight of | naphthalenesulfonic acid-formaldehyde condensation product, |
| 1.0% by weight of | the compound of the formula (1) (50% solution in ethylene glycol), |
| 1.5% by weight of | sodium 1-benzyl-2-heptadecylbenzimidazole-disulfonate and |
| 54.8% by weight of | water. |

(c) 12.5% by weight of C.I. Acid Red 251,

| | |
|---|---|
| 10.0% by weight of | aqueous sorbitol solution (containing a small amount of glycerol and water as stated under (a)), |
| 8.0% by weight of | naphthalenesulfonic acid-formaldehyde condensation product, |
| 8.5% by weight of | sulfite waste liquor (powder), |
| 2.0% by weight of | trimethylolglycololl (betaine), |
| 1.0% by weight of | the compound of the formula (1) (50% solution in ethylene glycol) and |
| 58.0% by weight of | water. |

(d) 18.0% by weight of C.I. Acid Blue 171,

| | |
|---|---|
| 5.0% by weight of | aqueous sorbitol solution (containing a small amount of glycerol and water as stated under (a), |
| 5.5% by weight of | naphthalenesulfonic acid-formaldehyde condensation product, |
| 2.5% by weight of | sulfite waste liquor (powder), |
| 19.5% by weight of | ε-caprolactam and |
| 49.5% by weight of | water. |

(e) 18.5% by weight of C.I. Acid Brown 226,

| | |
|---|---|
| 9.0% by weight of | aqueous sorbitol solution (containing a small amount of glycerol and water as stated under (a)), |
| 10.0% by weight of | naphthalenesulfonic acid-formaldehyde condensation product, |
| 7.5% by weight of | sulfite waste liquor (powder), |
| 1.0% by weight of | trimethylglycocoll (betaine), |
| 1.5% by weight of | the compound of the formula (1) (50% solution in ethylene glycol), |
| 1.0% by weight of | sodium 1-benzyl-2-heptadecylbenzimidazole-disulfonate and |
| 51.5% by weight of | water. |

(f) 15.5% by weight of C.I. Acid Black 132,

| | |
|---|---|
| 2.0% by weight of | aqueous sorbitol solution (containing a small amount of glycerol and water as stated under (a)), |
| 5.0% by weight of | sulfite waste liquor (powder), |
| 18.5% by weight of | ε-caprolactam, |
| 2.0% by weight of | trimethylglycocoll (betaine), |
| 0.5% by weight of | tartaric acid, |
| 1.5% by weight of | sodium 1-benzyl-2-heptadecyl benzimidazoledisulfonate and |
| 55.0% by weight of | water. |

What is claimed is:

1. A stable, concentrated, aqueous colloidal or dispersed preparation of a 1:2 metal complex dye, which comprises (1) 10 to 30% by weight of a 1:2 metal complex dye, (2) 3 to 30% by weight of an anionic dispersant, (3) 1 to 15% by weight of a polyalcohol of 2 to 6 hydroxy groups and 2 to 6 carbon atoms and (4) 0 to 25% by weight of a customary formulation assistant, and water in an amount such that the sum of all the components is 100%.

2. A preparation according to claim 1, which contains a 1:2 metal complex of an azo or azomethine dye or a mixture of these dyes as component (1).

3. A preparation according to claim 2, which contains a 1:2 cobalt or chromium complex of an azo or azomethine dye which contains a complexing group, in the o-position relative to the azo/azomethine bridge as component (1).

4. A preparation of claim 3 wherein the complexing group is selected from the group consisting of amino, carboxyl and hydroxyl groups.

5. A preparation according to claim 1, which contains a condensation product of an aromatic sulfonic acid and formaldehyde or a lignin- or oxyligninsulfonic acid or a mixture thereof as component (2).

6. A preparation according to claim 5, which contains a condensation product of a substituted or unsubstituted naphthalenesulfonic acid and formaldehyde, a condensation product of a naphthalenesulfonic acid, formaldehyde and a benzenesulfonic acid, a condensation product of a substituted or unsubstituted phenol- or cresolsulfonic acid and formaldehyde, an alkali metal salt of a condensation product of a substituted or unsubstituted phenolsulfonic acid, formaldehyde and urea, a condensation product of ditolyl ether, formaldehyde and sulfuric acid, an alkali metal salt or ammonium salt of a ligninsulfonic acid or oxyligninsulfonic acid or a mixture thereof as component (2).

7. A preparation according to claim 6, which contains ethylene glycol, diethylene glycol, triethylene glycol, 1,2-propylene glycol, dipropylene glycol, glycerol, trimethylolethane, trimethylolpropane, pentaerythritol or sorbitol or a mixture thereof as component (3).

8. A preparation according to claim 1, which contains (1) 10 to 20% by weight of a 1:2 metal complex dye, (2) 5 to 20% by weight of an anionic dispersant, (3) 2 to 12% by weight of a polyalcohol of 2 to 6 hydroxy groups and 2 to 6 carbon atoms and (4) 0 to 25% by weight of a customary formulation assistant, and water in an amount such that the sum of all the components is 100%.

9. A process for the preparation of a preparation according to claim 1, which comprises converting the dye into a free-flowing mixture with water and components (2), (3) and optionally (4), subsequently subjecting this mixture to mechanical comminution and then optionally adjusting the mixture to the desired concentration with water and optionally other formulation assistants.

10. A method of dyeing or printing nitrogen-containing, fibrous, textile materials which comprises applying to the textile material, a padding liquor, dyebath liquor or a printing paste prepared from a preparation of claim 1.

11. A method of claim 10 wherein the textile material is a synthetic polyamide.

12. A preparation of claim 1 wherein the particle size of the dye is in the range from about 1 to 5 micrometers.

* * * * *